Dec. 29, 1942.　　R. R. TUCKER ET AL　　2,306,835
METHOD OF AND APPARATUS FOR MANUFACTURING ARTIFICIAL FOLIAGE
Filed Aug. 12, 1940　　8 Sheets-Sheet 1
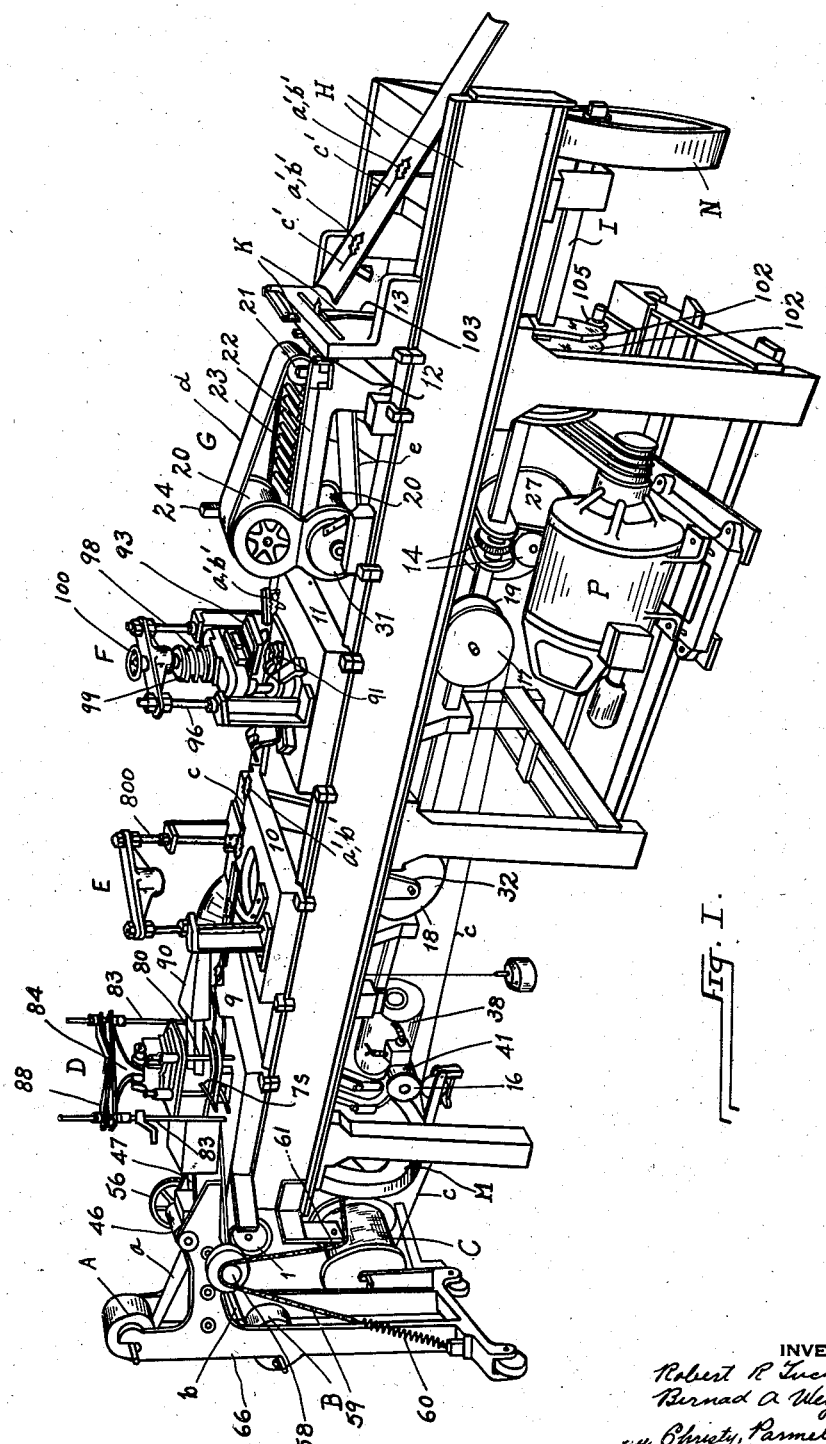
Fig. I.
INVENTORS
Robert R Tucker, and
Bernad A Weyl
by Christy, Parmelee & Wharton
their attorneys Dec. 29, 1942.   R. R. TUCKER ET AL   2,306,835
METHOD OF AND APPARATUS FOR MANUFACTURING ARTIFICIAL FOLIAGE
Filed Aug. 12, 1940   8 Sheets-Sheet 2
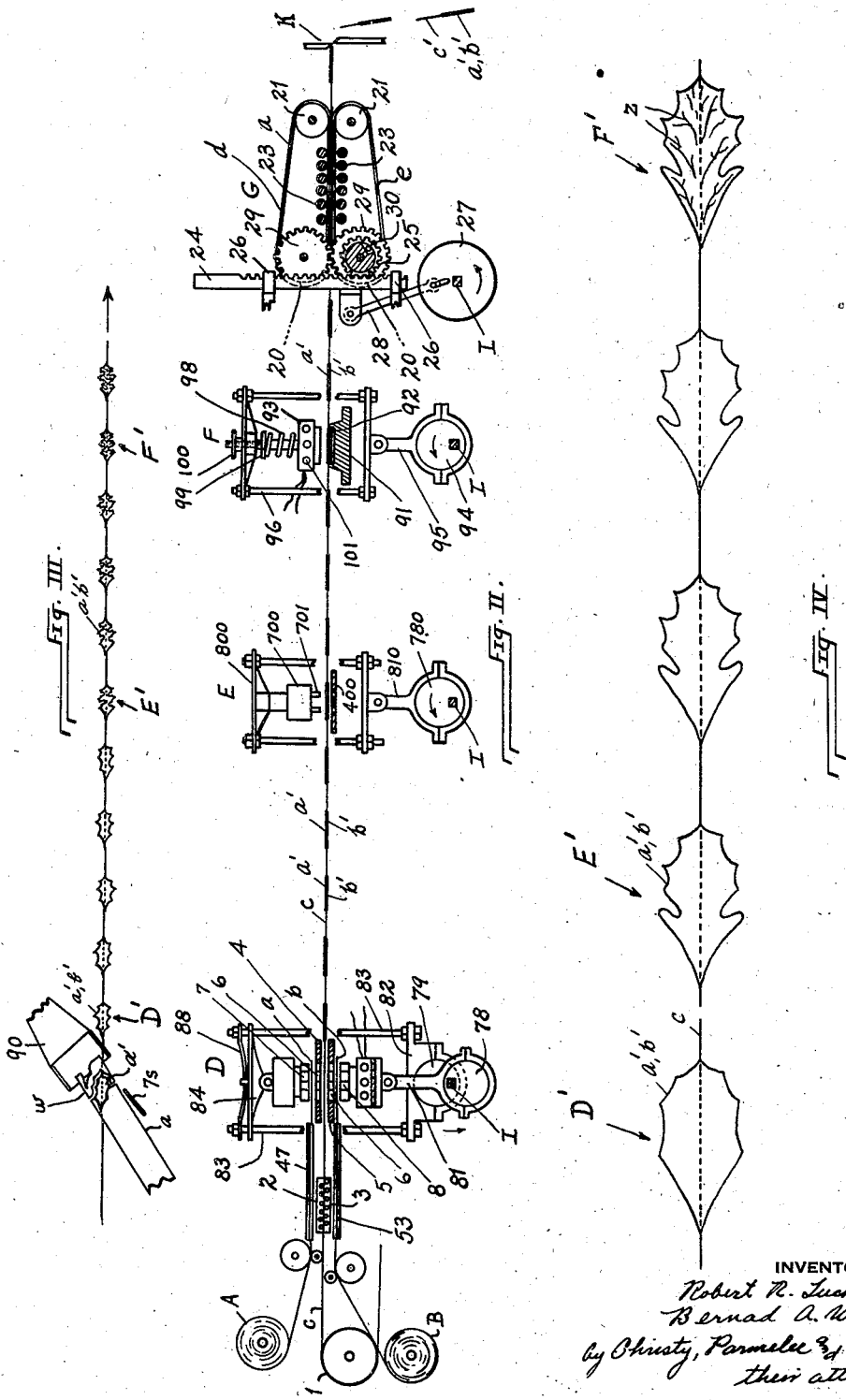
INVENTORS
Robert R. Tucker, and
Bernad A. Weyl
by Christy, Parmelee & Wharton
their attorneys Dec. 29, 1942. R. R. TUCKER ET AL 2,306,835
METHOD OF AND APPARATUS FOR MANUFACTURING ARTIFICIAL FOLIAGE
Filed Aug. 12, 1940 8 Sheets-Sheet 3
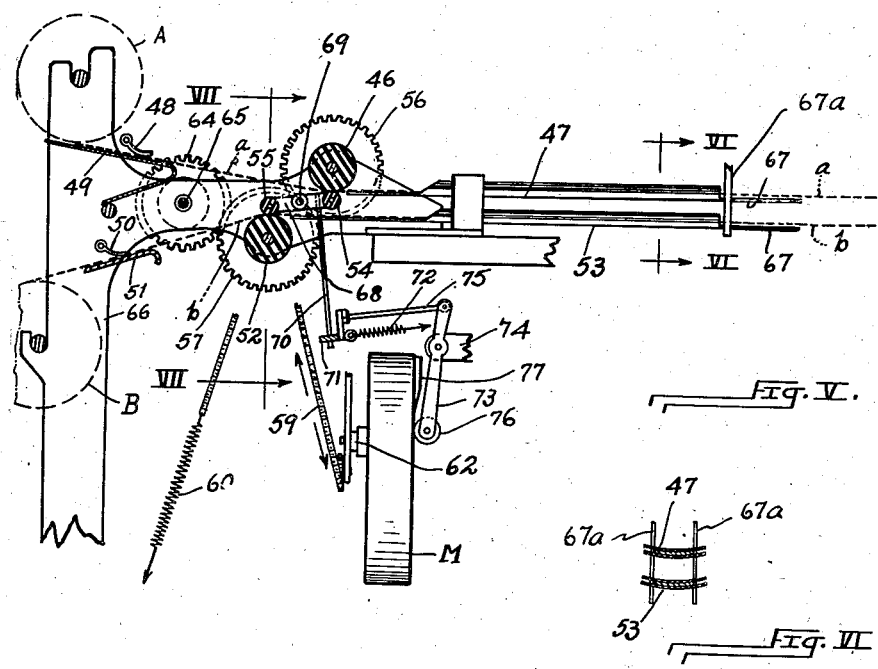
Fig. V.
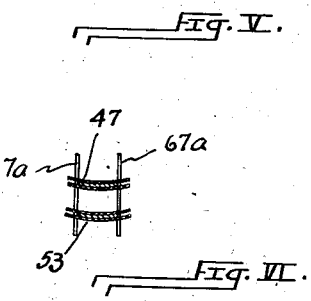
Fig. VI.
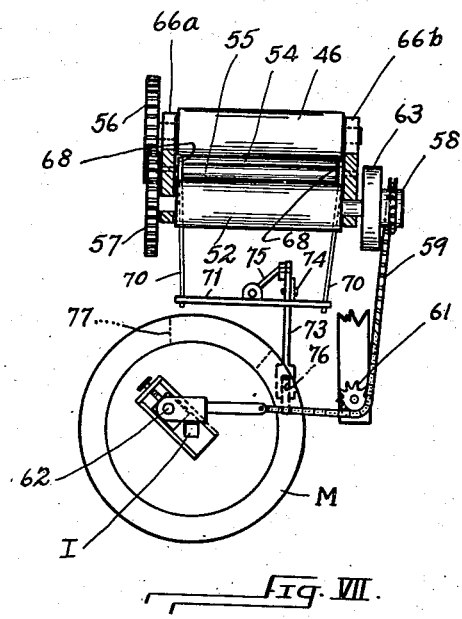
Fig. VII.
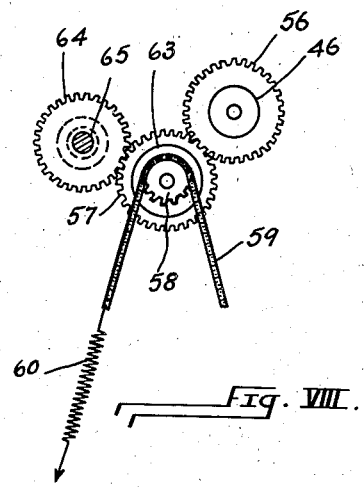
Fig. VIII.
INVENTORS
Robert R. Tucker, and
Bernad A. Weyl
by Christy, Parmelee and Wharton
their attorneys

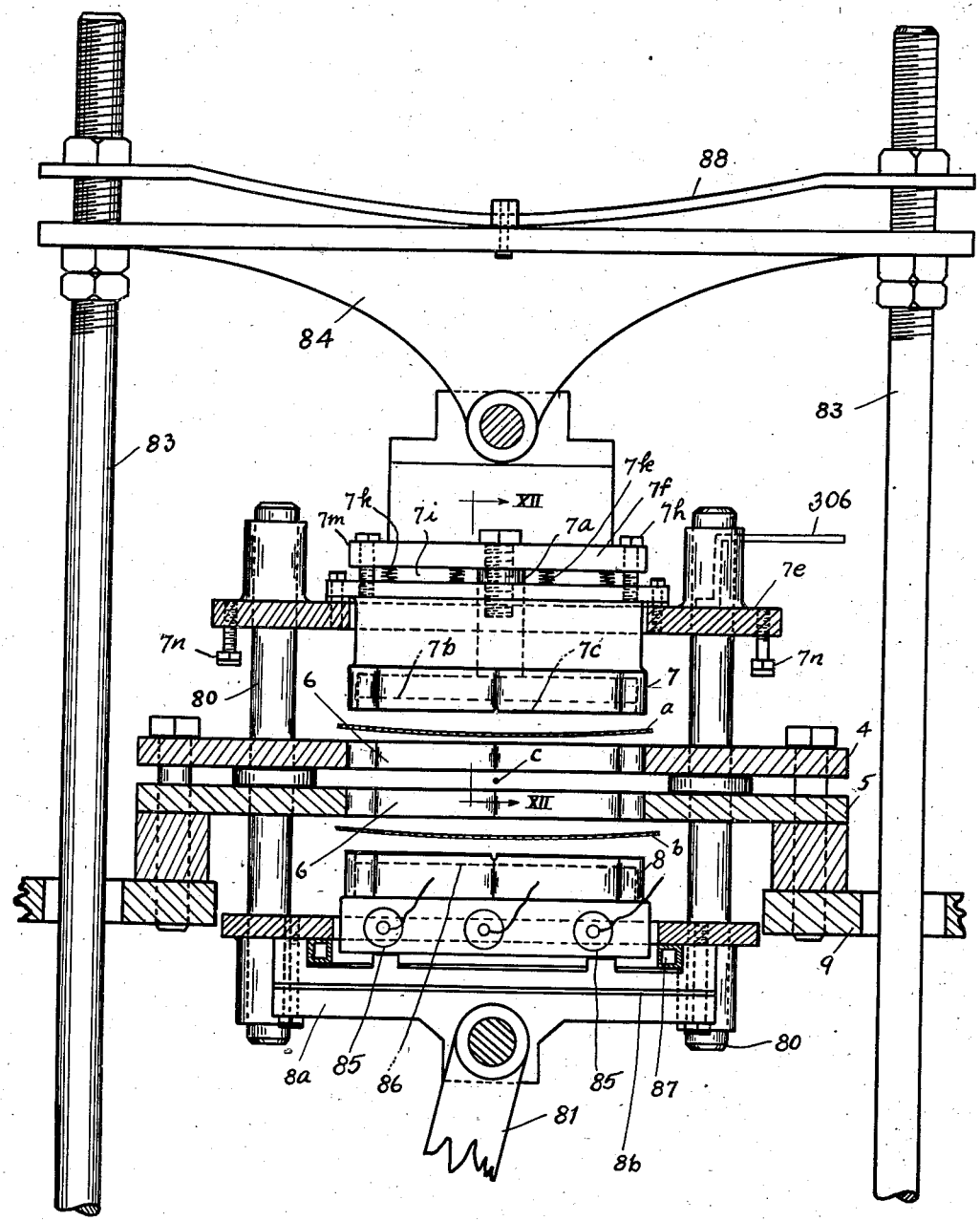

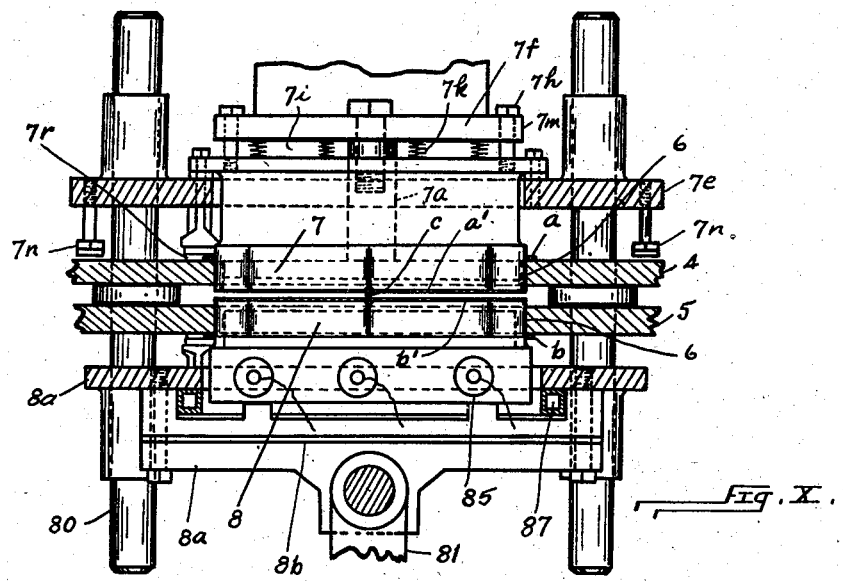
Fig. X.
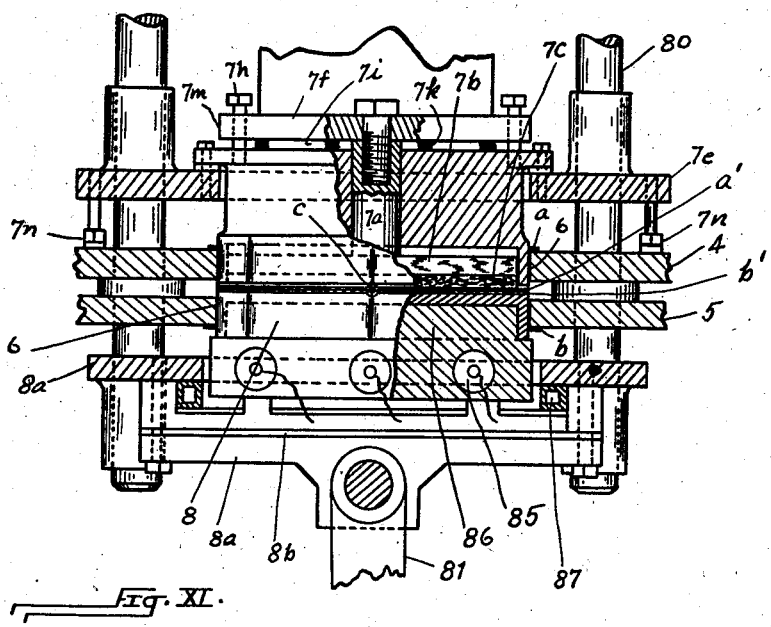
Fig. XI.

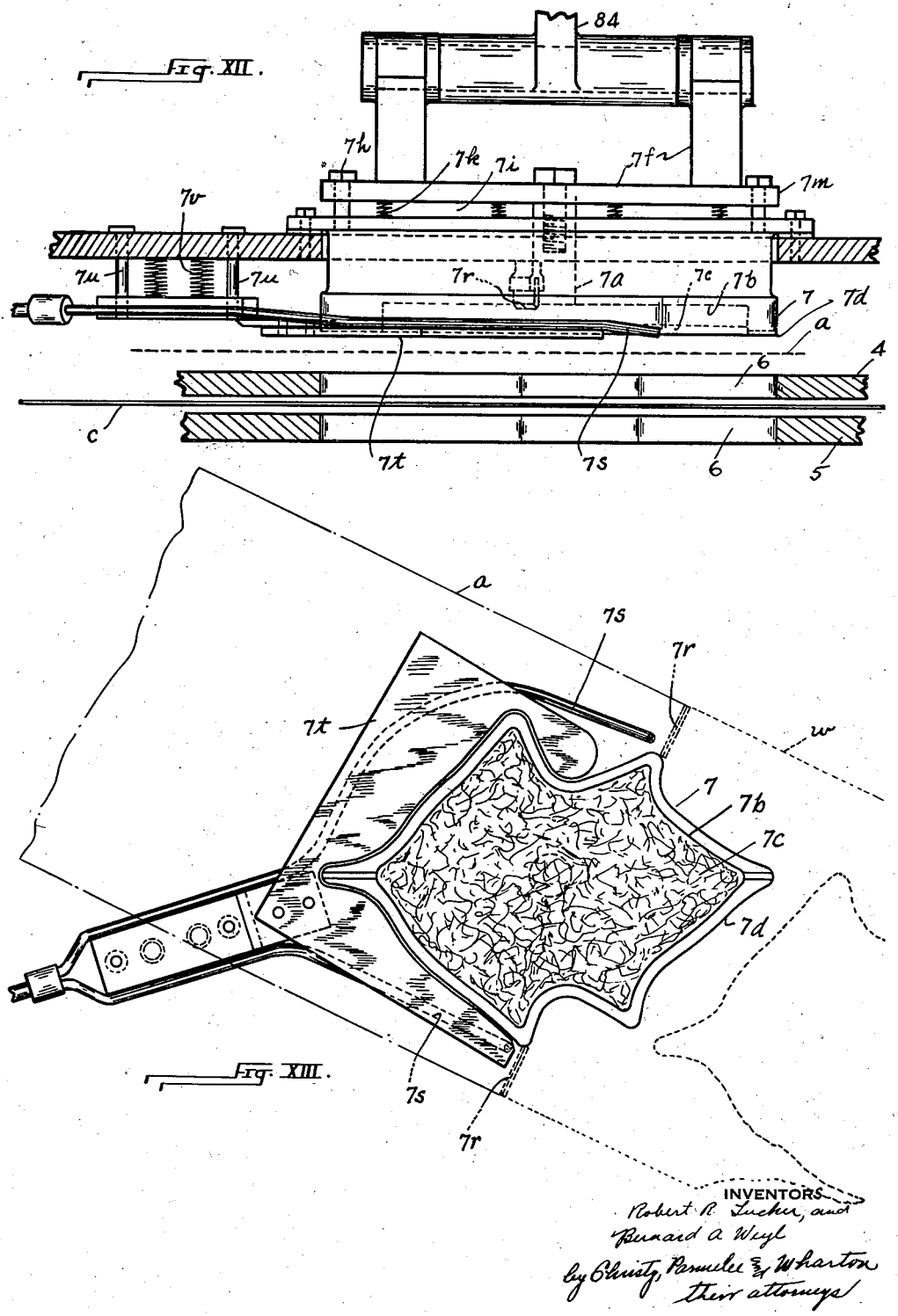

Dec. 29, 1942.                R. R. TUCKER ET AL                2,306,835
            METHOD OF AND APPARATUS FOR MANUFACTURING ARTIFICIAL FOLIAGE
                        Filed Aug. 12, 1940         8 Sheets-Sheet 7
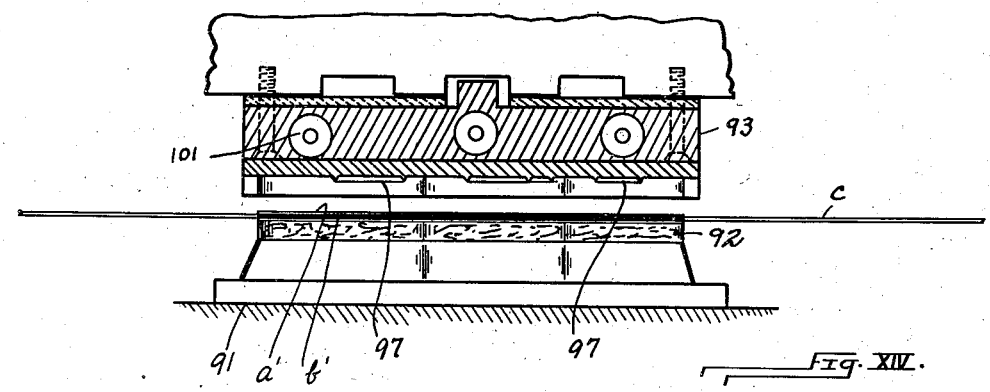
Fig. XIV.
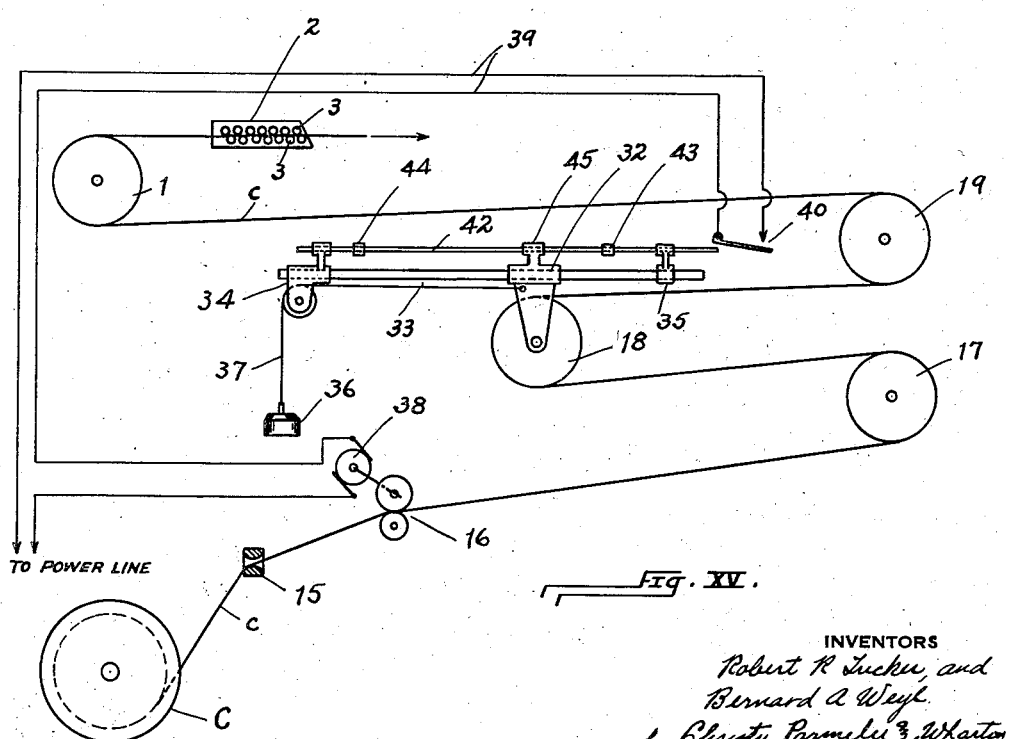
Fig. XV.
INVENTORS
Robert R. Tucker, and
Bernard A. Weyl.
by Christy, Parmelee & Wharton
their attorneys Dec. 29, 1942.   R. R. TUCKER ET AL   2,306,835
METHOD OF AND APPARATUS FOR MANUFACTURING ARTIFICIAL FOLIAGE
Filed Aug. 12, 1940   8 Sheets-Sheet 8
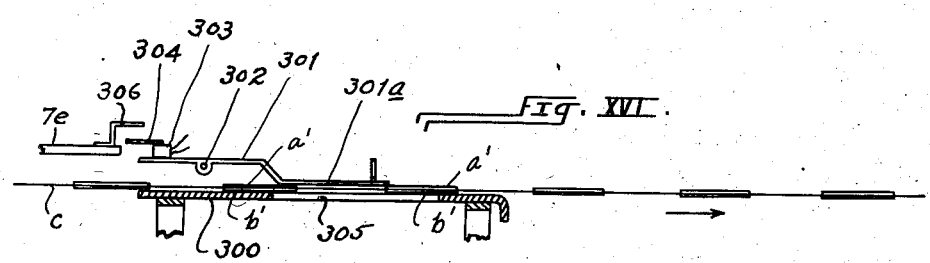
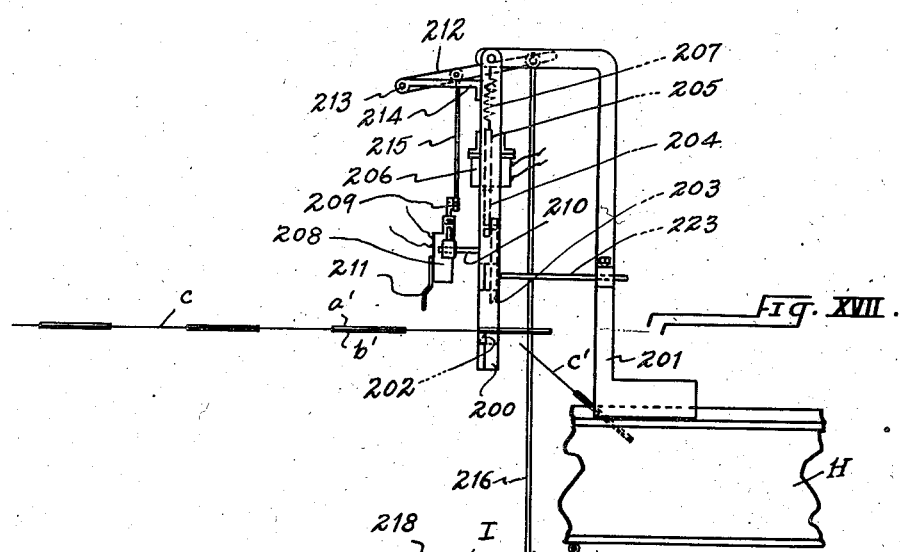
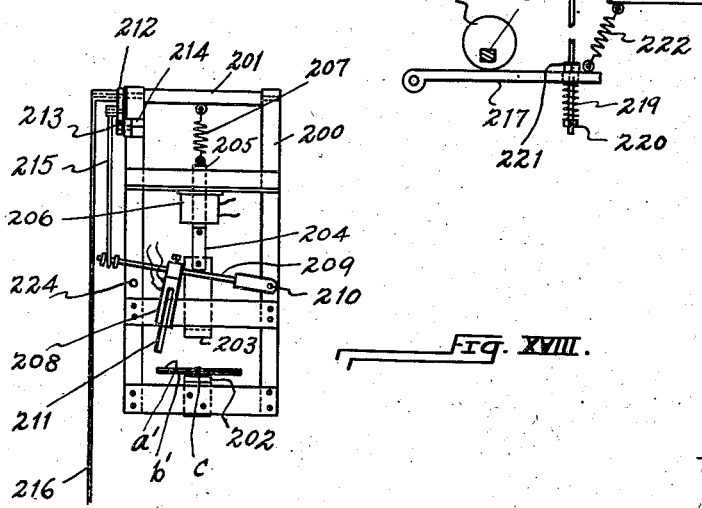
INVENTORS
Robert R. Tucker and
Bernard A. Welf
by Christy, Parmelee & Wharton
their attorneys Patented Dec. 29, 1942

2,306,835

UNITED STATES PATENT OFFICE 2,306,835

METHOD OF AND APPARATUS FOR MANUFACTURING ARTIFICIAL FOLIAGE

Robert R. Tucker and Bernard A. Weyl, Pittsburgh, Pa., assignors to Bernard A. Weyl Incorporated, a corporation of Pennsylvania Application August 12, 1940, Serial No. 352,278

45 Claims. (Cl. 41—2)

Our invention relates to the manufacture of artificial foliage, and consists both in method and in apparatus.

The object of our invention is to accomplish the manufacture of artificial foliage more economically, and with greater precision and uniformity of product. In the realization of such object, we have perfected an improved method of procedure, by virtue of which mechanical and automatic production becomes feasible, and in conjunction with such method we have developed an exceedingly effective machine.

The invention is particularly, though not exclusively, concerned with the production of artificial leaves that include two laminae, cut to identical pattern from paper, or paper-backed metal foil, or other suitable sheet material, and assembled in precise registry, one with the other, upon an interposed stem-forming strand of wire, or fibrous thread, or fabric tape, or the like. The paired laminae are bonded to the strand, and to each other throughout their meeting faces. In operation, the apparatus of the invention, provided with a supply of leaf-forming materials, produces the finished article, eliminating practically all manual operations.

While the apparatus of the invention is particularly adapted for the manufacture of such laminated leaves, we contemplate that it may with advantage be used in the production of other specific types of artificial foliage and flowers. And while the success of the apparatus depends in large measure, if not entirely, upon the method alluded to, it is to be noted that the method, as such, may be practised and enjoyed in apparatus other than that herein illustrated and described.

In the accompanying drawings, we illustrate a machine in which and in the operation of which the invention is realized:

Fig. I is a view of the machine in perspective;

Fig. II is a diagrammatic view of the several leaf-forming instrumentalities of the machine. These instrumentalities are aligned in spaced-apart relation upon the bed or base of the machine, and are arranged to be driven from a common drive shaft extending the length of the bed or base. With this in mind, it will be understood that the showing of Fig. II is conventionalized for purposes of illustration; that is to say, while the several forming instrumentalities are shown in the exact succession in which they appear in the machine, each instrumentality has been turned on a vertical axis through ninety degrees, in such way that the drive shaft appears in cross section with each instrumentality;

Fig. III is a diagrammatic view, illustrating in plan the successive leaf-forming operations;

Fig. IV is a view comparable with Fig. II, but to larger scale, illustrating two of the operations;

Fig. V is a fragmentary view, showing partly in side elevation and partly in vertical section the means for feeding into the machine the materials of which the leaves are formed;

Fig. VI is a view in cross section, on the plane VI—VI of Fig. V, of a pair of guides included in said feeding means;

Fig. VII is a fragmentary view of the said feeding means, partly in elevation and partly in section, on the plane VII—VII of Fig. V;

Fig. VIII is a view in side elevation of the driving gears of the feeding means;

Fig. IX is a vertical cross-sectional view of the primary leaf-forming mechanism of the machine, the plane of section extending transversely of the machine bed, and through the center of said mechanism;

Figs. X and XI are fragmentary views of the upper and lower dies of the primary forming mechanism or unit, and these two views, in conjunction with Fig. IX, illustrate successive stages of the leaf-forming operation;

Fig. XII is a fragmentary view, showing the die of the primary forming mechanism in side elevation, and showing certain associate parts in vertical section, on the plane XII—XII of Fig. IX;

Fig. XIII is a view in bottom plan of the said upper die, and of a stripper plate associated therewith; the sheet material from which such die successively cuts leaf-forming laminae is shown in broken and dotted lines;

Fig. XIV is a fragmentary view, partly in side elevation and partly in vertical section, of the dies that form veins in the leaves; these dies comprise in this case the final leaf-forming instrumentalities of the machine;

Fig. XV is a diagrammatic view of the means that deliver the wire into the machine, the wire that forms the stems of the leaves;

Fig. XVI is a schematic view of means for automatically arresting operation of the machine if and when the leaf-forming instrumentalities function improperly;

Fig. XVII is a fragmentary view, illustrating a modified form of certain wire-shearing mechanism included in the apparatus;

And Fig. XVIII is a view in elevation of a portion of the modified shearing mechanism, as seen from the left of Fig. XVII.

In accordance with the method of this invention, we apply to the sheet material of which the bodies of the leaves are formed, a film of a thermo-plastic substance, such as a synthetic resin, mixed with a plasticizer, or a mixture of resin and latex. As illustrated in this case, the sheet material consists in two elongate strips $a$ and $b$ of paper-backed aluminum foil, each coated on its paper side with a film of such thermo-plastic substance, and arranged in the form of a coil. The two coils are shown at A and B in the drawings. The particular manner in which the films of thermo-plastic material are applied to the strips is not of immediate concern, but it is important to note that the applied material is such in kind and character that it is substantially solid and dry at room temperature, whereby the coated strips may be readily unwound from the coils, without the turns of the coils sticking, and without the fouling of the uncoated surfaces of the strips. The normally solid thermo-plastic material may be reduced to fluid condition, say by means of heat, or by means of a volatile solvent, and sprayed upon one surface of each strip. Then the sprayed-on material is cooled, or the solvent is evaporated, with the effect that the applied films are solidified and dried. In producing artificial foliage, sections are cut from these film-bearing strips in the pattern of the leaf to be simulated, and the sections are applied and united to a strand that forms the stems of the leaves. In effecting this assembly and union of the leaf-forming sections or laminae with the stem-forming strand, the method of the invention is centered.

As already mentioned, we are particularly concerned with the manufacture of leaves formed of two patterned laminae that are assembled in face to face relation upon an interposed stem-forming strand and united thereto and to each other, and, while our method is herein described in connection with the manufacture of this particular type of foliage, it will be understood that the principles of the invention may be utilized in the production of leaves that consist of a single patterned section of sheet material united to a stem element, or of more than two sections or laminae assembled and united upon a stem element.

The stems of the leaves are formed in this case of a ductile metal wire, say a soft copper wire $c$, and advantageously the wire is provided with a coating of an adhesive substance that is similar to, if not identical with, the substance that forms the films on the strips $a$ and $b$. The two leaf-forming strips $a$ and $b$, led from the coils A and B, are brought into parallel, spaced-apart relation on opposite sides of a reach of the stem-forming wire $c$ (Fig. II), with the film-carrying faces of the strips directed towards each other. From each of the so disposed strips a leaf-forming lamina is cut, and the two laminae are immediately closed upon the interposed body portion of the wire, with the two laminae in precise peripheral registry and in surface-to-surface contact throughout their common area, save only in that lineal central region in which contact is made with the stem-forming wire. Heat and pressure are applied to the assembly, the heat reducing the otherwise solid and dry thermo-plastic substance borne by the laminae and wire to plastic or adhesive condition, and the pressure effecting the union of the laminae to each other and to the interposed body portion of the wire. When this has been accomplished the pressure is relieved and the united parts are allowed to cool to room temperature, with resolidification of the adhesive material and permanent integration of the several leaf-forming elements.

The temperature of the applied heat and the time interval of application are accurately controlled, to the end that the proper bonding of the parts shall be insured, without danger of overheating and damaging the leaf-forming laminae. When a leaf has been thus formed, veins may be impressed in its body, and its periphery may be trimmed to a more refined or elaborate outline, more closely to approximate natural leaves, and ordinarily (but not necessarily) the stem-forming wire is cut, to extend the desired interval from the basal end of the leaf.

In the conduct of such method it is conceivable that the several steps described may be conducted in a single machine operation. However, we have found it more feasible to perform the veining, the refining of peripheral contour, and the stem-shearing steps in successive operations after the leaf-forming laminae have been cut and united upon the wire. Indeed, the operation of bonding the two laminae together may be effected in two steps, rather than in one. That is to say, the laminae which are cut to pattern and assembled upon the stem-forming wire may be initially heated and bonded in a central region, to obtain primarily the integration of the two laminae to the interposed wire, and to each other in an area extending on opposite sides of the wire but terminating in an unbonded marginal area at the periphery of the leaf. Then in a secondary bonding operation, conveniently an operation combined with that that forms the veins, the leaf may be reheated, the adhesive again reduced to plastic condition, and with applied pressure the bonding of the leaf-forming laminae completed through their common area. Incidentally, this resoftening of the adhesive facilitates the embossing or impressing of sharp, well-defined veins in the body of the leaf, and, when the adhesive is thereafter resolidified, as in fact it is, the capacity of the body of the leaf to retain the impressed veins in well-defined outline is increased. With this general description of our method now presented, we shall turn to a consideration of the apparatus, and in such consideration of the apparatus certain specific aspects of the method will be brought into focus.

Referring particularly to Figs. I and II, the adhesive-coated wire is led from a spool C through tensioning means (shown in Fig. XV and later described), over a pulley $I$; from the pulley $I$ the wire passes through a straightener $2$ including a line of staggered rollers $3$ that in known way flex and remove kinks from the wire advanced therebetween; from the straightener $2$ the wire $c$ extends in a straight reach and in taut condition through the successive leaf-forming instrumentalities or units D, E, and F to a wire-advancing mechanism G. The mechanism G advances the wire step-by-step in left-to-right direction, the strips $a$ and $b$ being intermittently advanced in coordination with the wire. In the pause between each strip-and-wire-advancing operation of the machine, the unit D functions to cut a pair of leaf-forming laminae $a'$ and $b'$ from the two strips, and in a follow-through operation of the shearing dies of such unit the two laminae are united to the wire and to each other, forming a leaf $a'$, $b'$, as indicated at D' in Figs. III and IV.

Between each of the successive advances of the wire c and strips a, b through uniform intervals, a leaf is assembled upon the wire, and, in the course of the continuous operation of the machine, a succession of leaves is applied to the wire at uniformly spaced-apart points. Each of the successive leaves in turn is carried to and brought momentarily to rest in the unit E, and the operating instrumentalities of such unit function to trim and elaborate the peripheral contour of the particular leaf, as indicated at E' in Figs. III and IV, although it is to be noted that in some cases the leaves will not require such peripheral refinement, in which event the unit E will be omitted, or rendered inactive. Passing from the unit E the leaves successively come, in cadence with the operations described, into position of momentary rest in the unit F, and in this unit means operate to impress veins in the bodies of the leaves, as illustrated at F' in said Figs. III and IV. Upon proceeding from the unit F and through the wire-advancing mechanism G, the wire c is by means of synchronous shears K cut adjacent to the tip of each leaf, the wire portions in the intervals between the successive leaves providing on each leaf a stem that extends the desired interval from the base of the leaf, as may be perceived at c' in the drawings. Of course, if it is desired that the leaves shall not be detached from one another, the shears K will be omitted, or rendered inactive.

The movable operating elements of the wire-advancing mechanism G and of the shears K, and of the units D, E and F are driven from a common drive shaft I, extending the length of the machine and equipped at opposite ends with fly-wheels M and N. The drive shaft is continuously rotated by means of an electric motor P, Fig. I. The supporting frames 9, 10, 11, 12 and 13 of the units D, E, F, G and K, respectively, are secured upon the bed H of the machine, which bed is formed of two spaced-apart, parallel beams, as shown in Fig. I. These supporting frames of the several units are each adjustable longitudinally of the bed, to the end that the several units may be precisely oriented relatively to one another, to perform the synchronized operations described.

Turning to a more minute consideration of the machine structure, the wire-advancing mechanism G consists in two endless belts d and e of reinforced rubber, each trained over a pair of rollers 20 and 21 mounted in the frame 12 (Fig. I) that is adjustably secured upon the bed H of the machine. Two of the four reaches of the belts are arranged to extend horizontally in face-to-face contact, with upper and lower trains of backing rollers 23 (Fig. II) organized to insure snug contact of the said meeting reaches. The adhesive-coated wire c extends between, and is frictionally engaged by, the meeting reaches of the belts, and means are provided for intermittently rotating the rollers 20, 20, causing the belts periodically to travel, in such direction as to advance the wire step by step in left-to-right direction, and against the constant and uniform drag of the wire-tensioning means, illustrated schematically in Fig. XV. The means for so rotating the rollers consist in a rack 24 in mesh with a pinion 25 on the shaft of the roller 20 of the lower belt e; the rack is adapted to be vertically reciprocated in guides 26, by means of a crank 27 and crank-rod 28, driven by the constantly rotating drive shaft I. The rollers 20 of the two belts d and e are geared together—cf. the intermeshed gears 29, 29—and the pinion 25 is provided with a ball-ratchet connection 30 to the shaft of the roller 20 on which it is mounted. When the constantly reciprocated rack 24 moves through its upward stroke, the pinion 25 is rotated clockwise (Fig. II), and in such clockwise rotation the ratchet 30 locks the pinion to the shaft of the lower roller 20, with the effect that the two rollers 20 are turned, and the belts are caused to travel in such manner as to advance the wire in left-to-right direction through an interval equal to the center-to-center distance between the leaves to be applied to the wire. When the reciprocating rack has reached the top of its upward stroke, and the wire has been advanced through such an interval, the travel of the belts is arrested. In the ensuing downward stroke of the rack, the ratchet 30 in known way permits the idle rotation of the pinion 25 in counter-clockwise direction (Fig. II), leaving the belts d and e motionless, with the wire c secured in taut condition, under the stress of the wire-tensioning means described below. The shaft of the lower roller 20 is equipped, on opposite end from that on which the pinion 25 is mounted, with a ratchet that prevents retrograde travel of the belts when they reach the end of each wire-advancing movement. Such a ratchet brake is a device well known to the mechanic, and it is needless to illustrate it herein: Suffice it to say that the ratchet brake is arranged within a housing 31 (Fig. I).

It may be remarked in passing that the frame 12 upon which the belts d and e are mounted is made in upper and lower sections, with the rollers 20, 21 and 23 of the upper belt trunnioned in the upper section 22, as indicated in Fig. I. This upper frame section is vertically movable relatively to the lower section, so that the meeting reaches of the two belts may be separated, to admit of the longitudinal adjustment of the wire c in the machine, and to permit of regulation of the pressure of engagement of the belts with the wire and the leaves applied thereto.

It will be understood that the showing of Fig. II is schematic, with the successive units D to G of the machine arranged in proper succession, but with the drive shaft I, that actually extends in continuity beneath the line of units, appearing as though it were made in four parts, with each part extending transversely of the machine beneath one of said units. Whereas the crank-disk 27 is shown to be mounted upon the shaft I in Fig. II, such disk is in fact mounted for rotation in a vertical plane paralleling the shaft, and is connected to said shaft, by means of worm gearing, as shown at 14 in Fig. I.

The point at which the crank-rod 28 is pivoted to the disk may be varied radially of the disk, whereby the "throw" of the crank-disk may be varied, and the wire-feeding travel of the belts d, e regulated as need be.

Turning to Fig. XV, we shall consider the means for maintaining the wire c under substantially constant tension. The wire c in its course or extent between the supply coil C and the sheave or pulley 1, from which the wire extends to the straightener 2 and thence through the leaf-forming units D, E, F to the wire-advancing mechanism G, passes through a guiding "eye" 15, between pinch-wheels 16, and over three sheaves 17, 18 and 19. (Note the actual arrangement of the sheaves in Fig. I, as well as the schematic illustration in Fig. XV.) The sheaves 17 and 19 are mounted for rotation in fixed positions on the machine framework, while the sheave 18 is mounted for rotation in cross-head 32 that is slidable on a bar 33 fixed to the said framework. The bar 33 carries rigidly at its opposite ends two bearings 34 and 35, and a weight 36, acting through a flexible line 37, exerts stress on the cross-head 32, tending to shift it in right-to-left direction on the bar 33. The pinch-wheels 16 are connected through a gear-box 41 (Fig. I) to an electric motor 38, whose energizing circuit 39 includes a switch 40 that normally stands in open position, with the motor 38 idle and the wheels 16 "locked" against rotation by the gears in box 41. So long as the motor remains de-energized, the pinch-wheels 16 anchor the wire c; that is, prevent the wire from unwinding from the coil under the influence of the weight 36 acting through sheave 18 upon the bight formed in the wire between the sheaves 17 and 19. The entire length of the wire extending from the pinch-wheels 16 to the feeding mechanism G is held under a uniform or constant tension, imposed by the freely hanging weight 36 that, as said, tends to shift the sheave 18 in right-to-left direction. As the feeding mechanism G advances or draws the wire c step-by-step through leaf-forming units D, E, F of the machine, the sheave 18 shifts in left-to-right direction, and the wire required to permit the advance is paid out from the bight between the sheaves 17 and 19. Thus, the wire is fed into the machine, and, manifestly, the tension on the wire in the machine is maintained at substantially constant value, both when the wire is in course of advance and when it is at rest between the successive advances. As in the course of such operation the sheave 18 approaches the right-hand end of the bar 33 on which it is slidably supported, the switch 40 is closed; the motor 38 is energized; and the pinch-wheels 16 are powerfully rotated, drawing wire from the supply coil C. While the wire is thus being fed in left-to-right direction through the pinch-wheels 16, it being noted that the motor 38 and wheels 16 operate to feed the wire at a slightly greater linear speed than that at which the feeding mechanism G draws the wire into the machine, the sheave 18 and its support 32 move in right-to-left direction under the pull of the weight 36, and the length of the wire in the bight between sheaves 17 and 19 is increased. As the length of wire in such bight reaches its original value, the switch 40 reopens; the motor 38 stops; and the pinch-wheels 16, coming to rest again, again anchor the wire at the point at which they engage it. All of this operation is automatic.

The means for automatically starting and stopping the motor 38 consist in a rod 42 slidable horizontally in the rigid bearings 34, 35 on the bar 33. The rod 42 carries two fixed collars 43 and 44, spaced apart as shown, and the sheave-supporting slide or head 32 includes a portion 45 that loosely embraces the rod 42. When the sheave 18 approaches the right-hand end of its range of movement, the portion 45 comes to abutment upon the collar 43, whereby the rod 42 is carried with the sheave 18 in left-to-right direction until the right-hand end of the rod makes contact with the arm of switch 40, and swings it upward into circuit-closing position. At that instant the motor 38 begins to run; the wheels 16 start their wire-feeding operation; and the sheave 18 travels right-to-left, with bight-enlarging movement. During this phase of the operation the rod 42 remains in switch-closing position, while the cross-head portion 45 moves away from the collar 43 on such rod. As the sheave 18 approaches the left-hand end of its traverse, the portion 45 makes contact with the collar 44, and carries the rod 42 back into its original position, reopening the switch 40, and de-energizing the motor 38, with the length of wire in the bight restored to original value. In this manner the wire is fed into and through the leaf-forming units of the machine, and is therein held under substantially constant tension.

Turning to Figs. V to VIII, the means for feeding the strips $a$ and $b$ to the leaf-forming unit D will be considered in detail. The strip $a$, led from the supply coil A, passes beneath a rubber roller 46 and through a guide 47, and in its extent between the coil and such roller the strip is by a resilient finger 48 pressed to the surface of a plate member 49. Similarly, the strip $b$ is led between a finger 50 and a plate member 51, over a roller 52, and through a guide 53. The two strips $a$ and $b$ are severally held in contact with the rollers 46, 52, by means of idler rolls 54 and 55, respectively; the two rollers 46, 52 are intermittently rotated in unison with the wire-advancing operations of the mechanism G, and these rollers serve to feed the two strips $a$ and $b$ to the leaf-sharing instrumentalities of the unit D, in such manner as to permit successive pairs of leaf-forming laminae to be cut therefrom, one lamina of each pair from each strip, for assembly upon the wire $c$.

The two rollers 46 and 52 are interconnected for joint rotation, by means of gears 56 and 57, and on the shaft of the roller 52 a sprocket-wheel 58 is mounted. A sprocket-chain 59 is trained on the sprocket-wheel; the sprocket-chain, passing downward from one side of the sprocket-wheel, is anchored to the upper end of a tension spring 60, the spring being anchored at its lower end to a stationary portion of the machine framework, as shown in Fig. I. Extending downward from the opposite side of the sprocket-wheel, the sprocket-chain passes over an idler wheel 61, and at its end is pivotally connected to the fly-wheel M, as at 62, at an interval from the center of fly-wheel rotation. The sprocket-chain in such assembly is held taut, under the tension of spring 60, and, with the fly-wheel in continuous rotation, the sprocket-chain is manifestly caused continuously to travel, first in one direction and then in the other, as indicated by the arrows in Fig. V, with the effect that the sprocket-wheel 58 is continuously rotated, first clockwise and then counter-clockwise. The connection of the sprocket-wheel to the shaft of roller 52 is through a ball-ratchet 63, so organized that the shaft of roller 52 is rotated in unison with the sprocket-wheel, when such wheel turns clockwise (Fig. V), and, alternately, stands idle when the sprocket-wheel turns counter-clockwise, retrograde turning of the rollers being prevented by means of a ratchet-gear 64 mounted on a stub-shaft 65 rigid with the feeder frame 66 and meshing with the gear 57. Thus, the reciprocating sprocket-chain intermittently rotates the roller 52 in clockwise direction, and, by virtue of the gears 56, 57, the roller 46 rotates in concert with roller 52 in counter-clockwise direction, whereby the strips $a$ and $b$, held by the idler rolls 54 and 55 to the faces of said driven rollers, are intermittently advanced step by step to the unit D. The eccentricity of the pivotal connection of the chain to the fly-wheel is adjustable, as is manifest in the showing of Fig. VII, and, obviously, such adjustment affords regulation of the otherwise constant interval through which the strips are advanced in each rotative movement of the rollers 46, 52.

The guides 47 and 53 through which the strips $a$ and $b$ are fed to the shearing instrumentalities of the unit D merit particular attention. Each of such guides consists in a pair of elongate plates of arc shape in cross section; the two arc-shaped plates of each guide extend in parallelism (Fig. VI), with enough space between the plates to receive and slideably support one of the strips $a$, $b$. The lower plate of each pair is continued in a tongue portion 67 that terminates at its outer end adjacent to the shearing instrumentalities of the leaf-forming unit $d$, and the two supported strips freely extend an interval beyond the tongue portions of the two guides, as shown in dotted lines at the right of Fig. V; the extending ends of the strips are positioned one between each of the two pairs of shearing members of the unit D, presently to be described.

By virtue of the particular shape of the guides, the strips $a$ and $b$ extending therethrough are transversely dished or bowed, affording in the otherwise flexible strips a rigidity that is adequate to sustain the ends of the strips projecting from the tongues 67 in proper horizontal position to be acted upon by the shearing members of the unit D. The strips advancing from the ends of the guides pass between fingers 67$a$ that serve to center the projecting ends of the strips with respect to the dies 7 and 8. After each strip-advancing rotation of the rollers 46, 52, the idler rolls 54, 55 are momentarily shifted, to relieve the pressure that holds the strips secure against the surfaces of said rollers 46, 52, and in such moment of pressure relief, the transversely bowed strips "square" themselves, under the influence of their slight inherent elasticity, in the guides, and eliminate any tendency for the strips to buckle in the guides, or to creep out of alignment. Thus, we obviate any tendency for the strips, in prolonged periods of machine operation, to become disarranged in the guides. The paper-feeding means described permit the strips of paper to be pushed, rather than pulled, into position for the shearing dies. Never before has this advantageous manner of advancing flexible paper strips to shearing dies been achieved in practice.

In providing for the relief of pressure of the strips against the feeding rollers 46, 52, we journal the idler rolls 54, 55 in two rocker arms 68; these rocker arms are pivoted, on an axis 69 that extends between and parallel to the idler rolls, to the two frame member 66$a$ and 66$b$ (Fig. VII) that support the rollers 46, 52. Extending downward from each arm 68 is a rod 70; the two rods 70 are united at their lower ends by means of a cross-bar 71, and a tension spring 72 extends from such cross-arm to a stationary part of the machine framework. The stress of such spring, acting through rods 70, tends to turn the rocker arms 68 counter-clockwise (Fig. V), and thus the rolls 54, 55 are caused yieldingly to secure the strips $a$ and $b$ severally in contact with the surfaces of the rollers 46, 52. Means function at the end of each strip-advancing rotation of the rollers 46, 52 to swing the rods 70 against the tension of the spring 72, and such movement of the rods swings the arms 68 clockwise (Fig. V) and moves the idler rolls away from the driven rollers 46, 52, relieving the pressure that holds the strips $a$ and $b$ against rollers 46, 52, and permitting the strips to align and center themselves, in the manner described above. The means alluded to consist in a lever 73 pivoted intermediate its ends to a portion 74 of the machine frame; the upper end of the lever is by a rod 75 connected to the cross-bar 71, while the lower end of the lever carries a wheel 76 that "rides" one of the side faces of the rim of the continuously rotating fly-wheel M. A peripherally extending cam 77 is secured to such side face of the fly-wheel, and in the course of fly-wheel rotation this cam engages the wheel 76 and swings the lever 73 counterclockwise, whereupon the idler rolls 54, 55 are moved into strip-releasing positions, in which positions they remain for the interval that the cam-wheel 76 is engaged by the revolving cam 77. As the revolving cam moves from such engagement with the wheel 76, the shifted parts, under the tension of spring 72, return to the positions in which they are shown in Fig. V.

It will be understood that the strip-advancing movement of the rollers 46, 52 originates in the rotating fly-wheel M, and that the instrumentalities, which momentarily release the engaged strips at the end of each advance, also derive their movements from the said fly-wheel. Thus it is that there is absolute synchronism of the several essential movements of the strip-feeding apparatus. And as already mentioned, the mechanism G that advances the wire $c$ through the machine is driven from one and the same continuously rotating shaft I that carries the fly-wheel M, wherefore the successive advances of the wire is positively timed with the successive advances of the strips $a$ and $b$. As will now appear, the moving elements of the leaf-forming units D to F and of the shears K are also driven by the common drive shaft I, with the consequence and effect that all operations of the machine are precisely coordinated.

The unit D includes two female die members or shear-plates 4 and 5 mounted in close parallelism on the frame 9, one above and one below the horizontal reach of the adhesive-coated wire $c$. Note Figs. II and IX to XII. Each shear-plate includes an orifice 6 which in plan is formed in the shape of the patterned laminae of which the desired leaves are formed. The orifices in the two shear plates are of identical pattern, and are vertically aligned, and the peripheries of the two orifices provide shearing edges that severally cooperate with the correspondingly contoured peripheral edges of upper and lower shearing blocks or dies 7 and 8 in cutting patterned laminae from the terminals of the adhesive-faced strips $a$ and $b$ that extend from the guides 47, 53, as illustrated in Fig V. The terminal end of the strip $a$ is positioned, with its adhesive-bearing face directed downward, between the upper shearing members 4 and 7 (Fig. IX), while the end of strip $b$ is positioned, with its adhesive-bearing face directed upward, between the lower shearing members 5 and 8.

The two dies 7 and 8 are mounted for relative vertical reciprocation upon posts 80 rigid with the frame 9, and the means for powerfully operating the dies consist in two eccentrics 78 and 79 (Fig. II) secured upon the drive shaft I. A pitman 81 in known way connects the eccentric 78 with die 8, and a pitman 82—a yoke-like structure including two rods 83 and a cross-head 84—connects the eccentric 79 to the die 7. The two eccentrics are spaced apart 180° on the shaft I, and, rotating in unison with such shaft, the eccentrics operate, each through its associate pitman, to reciprocate the dies 7 and 8 continuously, first closing the dies (to cut a pair of laminae from the ends of strips a, b and assemble such laminae upon the wire c), and then opening the dies.

The dies 7 and 8, as they close in unison upon their associate shear-plates, punch or cut patterned laminae a' and b' (Fig. X) from the ends of the strips a and b. Upon cutting such laminae, the closing movement of the dies 7 and 8 continues without interruption, carrying the two laminae inward (one downward and one upward) through the shearing orifices 6 in the two shear-plates 4 and 5, into contact with the interposed wire c and with each other, as shown in Fig. XI. The adhesive-carrying face of one lamina bears upon the adhesive-carrying face of the other. In such movement of the parts, the orifices 6 in the shear-plates hold the two patterned laminae a', b' in vertical alignment, so that precise peripheral registry of the two laminae is obtained when they are, by the closing dies 7 and 8, brought into contact with the interposed wire c and with each other.

The body of the lower die 8 includes a core 86 of heat-conducting material, such as copper, which is by means of electric heating elements 85, maintained at a temperature of from 300 to 350° F. The heat of this core, applied upon the nether side of the assembled laminae a', b' (Fig. XI), is effective to reduce the normally solid coatings of thermo-plastic material on the wire and the laminae to plastic and adhesive condition, with the effect that the laminae, under the pressure of the dies 7 and 8, are bonded to the wire and to each other. When in the course of the continuous reciprocation of the dies, the dies are moved apart, the united coatings of thermo-plastic material resolidify, with permanent integration of the assembled leaf-forming elements. During the opening movement of the dies, the mechanism G operates to advance the wire c a step, thereby carrying the applied leaf from between the shear-plates 4 and 5 towards the unit E. And simultaneously with such advance of the wire the rollers 46, 52 are rotated, advancing the strips a and b, whereby the dies 7 and 8 in their next-ensuing closing movement are adapted to cut and assemble upon the wire a succeeding pair of leaf-forming laminae. The operation is repeated time and again, and leaves a', b' are applied at spaced-apart points to the wire c.

While the shear-plates 4 and 5 are in this case rigidly mounted on the frame 9, it will be manifest that they may be mounted for relative vertical movement, a movement such in character as will permit the two plates to close tightly upon the wire during the intervals in which it is at rest between the successive actuations of the mechanism G, and, alternately, to permit the plates to open sufficiently for the wire, and the leaf assembled thereon, to move freely from between the plates when the wire is advanced.

It is important to note that means are provided for cooling the periphery of the heated die 8, in order to guard the shearing edges of the die and its associate shear-plate 5 from the thermal effects of the hot core 86, as well as to prevent thermal distortion of the die-carrying portion 8a that slides on the posts 80. Such means consist in a hollow metal duct 87 that is borne in die-encompassing position upon, and in thermal communication with, the portion 8a that carries the die 8. A circulation of cooling liquid is maintained in the hollow tube, and thus the desired ends are gained. It may also be noted that the die-supporting portion 8a is made in two sections, with a lamination 8b of asbestos, or other suitable insulating material, arranged therebetween, and serving to protect from heat the pivot-joint between the pitman 8l and the die-supporting portion 8a.

The die-closing stress exerted by the rods 83 is transmitted through a leaf-spring 88 to the supporting head 84 of the upper die 7, and thus it is that the pressure of the two dies upon an assembled pair of leaf-forming laminae is a yielding pressure.

We have found it to be advantageous initially to concentrate the laminae-uniting heat and pressure of the dies upon a central area of the assembled laminae, and thereafter to apply heat and pressure to the peripheral area that borders such central area. In accordance with this discovery, we provide within the body of the upper die 7 a plug or plunger 7a having a head 7b that nests within the body of the die. The shape of the plunger head 7b corresponds in plan to the periphery of the die, as may be best seen in Fig. XIII, the exposed surface of the die being in the main formed by the face of the plunger head, leaving between the shearing edge 7d of the die and the periphery of the plunger head a bordering die body portion that provides the required structural reinforcement or backing for the said shearing edge of the die. The plunger head 7b is faced with an elastic pad 7c of felt. When in the laminae-uniting operation the dies 7 and 8 close, the downward thrust exerted by the head 84 upon the upper die is transmitted to the plunger 7a, with the consequence that the effective pressure of the dies is concentrated upon that area of the assembled laminae which is engaged by the elastic face 7c of the plunger-head. See Fig. XI. Thus, the bonding or laminae-uniting heat and pressure applied by the dies is primarily effective on the central area of the laminae immediately engaged by the plunger-head 7b, leaving a marginal area in which the union of the laminae is subsequently effected—effected in this case, as appears below, in the unit F that provides the veins in the leaves.

In the achievement of this particular method of uniting the leaf-forming laminae a' and b', the specific structural organization of the die 7 is important. Referring particularly to Fig. IX, the body of the die 7 per se is rigidly united to a carriage element 7e that is adapted to slide on the vertical posts 80. A block 7f, pivoted to the vertically reciprocated head 84, is secured to the die 7, by means of screws 7h. The plunger 7a, extending upward through the body of die 7, is integrated with the block 7f. A space 7i is provided between the block 7f and the die 7, and in this space a plurality of compression springs 7k is arranged. The springs 7k normally hold the block 7f and the die 7 in the relative positions illustrated, with the laterally extending portions 7m of the block pressed against the heads of screws 7h, and with the felt-covered face of the plunger head 7b flush with the plane of the shearing edge of the die 7. It is to be noted that the block 7f is movable on the shanks of screws 7h relatively to the die 7 and against the stress of the springs 7k. In the closing movement of the dies 7 and 8 the thrust of the head 84 is transmitted through the block 7f and the springs 7k to the die 7, and the aggregate strength of these springs is such that they do not yield to any appreciable degree when the die 7 closes upon the strip $a$, and shears therefrom a leaf-forming lamina $a'$. When, however, the die 7 in its continuing downward movement carries the laminae downward through the orifice in the shear-plate 4 to the lamina $b'$ pressed upwardly by the die 8, stops 7n borne by the carriage 7e come to abutment upon the upper face of the shear-plate 4, and arrest the descent of the die 7. Under the continued downward thrust of the head 84, the block 7f moves further downward, compressing the springs 7k and carrying the plunger 7a downward into the position illustrated in Fig. XI, with the effect that the felt-surfaced head 7b of the plunger presses the meeting laminae $a'$ and $b'$ against the heated die 8 and effects the union of the laminae, as described above. Upon the ensuing opening movement of the dies 7 and 8, the springs 7k return the plunger 7a and its head 7b to normal position relatively to the die 7, shown in Fix. IX.

Before describing the operations of the units E and F, it should be noted that the dies 7 and 8 are provided with means for cutting and removing the scrap left on the strips $a$ and $b$ after each pair of leaf-forming laminae have been cut therefrom. We shall describe such means in association with the upper die 7, with the understanding that similar means are organized with the lower die 8.

Referring to Figs. XII and XIII, two knives 7r are rigidly mounted on the carriage 7e that bears the die 7. The knives are arranged on opposite sides of the die, as shown in dotted lines (7r) in Fig. XIII which shows the die in plan from beneath. When a leaf-forming lamina has been sheared from the strip $a$ and the die has reached the lower limit of its travel, the lower edges of these knives cooperate with the upper surface of the shear-plate 4 in cutting away the scrap or waste $w$. The so-detached scrap is by means of air jets from tubes 7s blown from the face of the shear-plate 4 into a waste duct 90 (Figs. I and III) that extends to an exhaust fan and a waste receptacle that are not shown. In order to prevent the remaining body of the strip $a$, to which the reference character $a$ is immediately applied in Figs. III and XIII, from "hanging" on the side of the die 7, a stripper plate 7t is provided. The stripper plate is formed snugly to embrace the side of the die through about one-half of its peripheral extent; the plate is suspended upon two headed stems 7u from the die carriage 7e, with compression springs 7v arranged to urge the plate downward into the position shown in Fig. XII, with the heads of stems 7u positioned against the upper surface of the carriage 7e, and the lower face of the stripper plate positioned in a plane immediately below the lower face of the die 7. When in the operation of the machine the die 7 descends, the stripper plate, descending with the carriage, presses the strip $a$ flat against the surface of the shear-plate 4 and comes to rest, while the carriage 7e continues its downward travel (with compression of springs 7v), and carries the die 7 through a lamina-shearing and leaf-assembling operation. As the die reaches the lower limit of its travel, the waste $w$ is cut from the strip $a$, and a blast of compressed air is delivered to the tubes 7s with the results already mentioned. The air compressor and the valve mechanism for controlling the delivery of the air to the tubes 7s are not illustrated—these are things well known to the engineer, and it is needless to involve this specification with a consideration of them. Upon the completion of the leaf-forming operation, the carriage 7e rises, moving the die 7 upward. As the lower face of the ascending die moves upward from the upper face of the shear-plate 4, the stripper plate 7t lags behind, until the lower face of the die rises a slight interval above the lower face of the stripper plate (cf. Fig. XII), whereupon the ascending carriage engages the heads of the stems 7u, and, during the continued ascent of the carriage to the top of its range of travel, the stripper plate moves in unison with the die. Manifestly, the above-described lag in the rise of the stripper plate operates to prevent the strip $a$ from "hanging" or sticking to the die 7.

Turning to the unit E: This unit is brought into play only when it is desired to elaborate the peripheral contour of the leaves cut and assembled upon the wire by the unit D, it being noted that it is preferable to limit, so far as possible, the peripheral extent of the patterned laminae that the dies of unit D are required to cut, for in such way certain shearing difficulties are avoided. Thus, if the leaves in production have a relatively simple contour, such as the leaf shown at F in Fig. IV, the unit E will not be needed, since the unit D is fully capable of shearing and assembling such simple leaves upon the wire. If, on the other hand, leaves of the elaborated periphery shown at E' are desired, the unit E is brought into service.

The unit E includes a shear-plate 400 (Fig. II) that is secured on the frame of the unit, and a shearing die or punch 700 that is mounted in a vertically reciprocated head 800. The means for reciprocating the head 800 consist in an eccentric 780 on the shaft I, and a pitman 810. (In Fig. I, the shear-plate is not shown in position of service on the frame 10 that carries it, nor is the die 700 shown in assembly with the head 800.) The die 700 includes shearing elements 701 that cooperate with appropriately formed orifices in the shear-plate, in cutting the leaves $a'$, $b'$ to the desired refined configuration. That is, in the step-by-step advance of the wire $c$, the leaves applied by the unit D to the wire are successively carried to, and brought momentarily to rest upon, the shear-plate 400, and in the intervals between the successive advances of the wire the die 700, in conjunction with the shear-plate, cuts the leaves to the desired elaborated form.

In the unit F two things are accomplished: 1, veins are impressed in the bodies of the leaves, as shown at $z$ in the leaf F' of Fig. IV; 2, the two laminae of each leaf are united in the marginal area in which union was not completed in the unit D. To this end the unit F includes a leaf-receiving anvil 91, rigidly mounted on the stationary frame or base 11 of the unit (Fig. I). The work-receiving face of the anvil is formed of a felt pad 92 (Figs. II and XIV) that in plan is fashioned to the exact shape of the leaves $a'$, $b'$ that are, in the intermittent advances of the wire $c$, brought successively to rest upon, and in registry with, such anvil pad. Above the pad a die 93 is organized. This die is carried by a vertically reciprocable yoke 96, and such yoke is continuously reciprocated, by means of an eccentric 94 on the drive-shaft I and a pitman 95. The die is provided on its lower face with outstanding ribs 97 (Fig. XIV) in the pattern of the veins to be impressed in the leaves, and, as each leaf is brought to position of rest on the anvil, the die, reciprocated in coordination with the advances of the leaf-carrying wire c, closes forcefully upon the anvil and impresses veins in the leaf, the felt pad 92 yielding under the pressure of the die, particularly on the lines on which the body of the leaf is engaged by the vein-impressing ribs 97. The pressure of the die upon the work is a resilient pressure, a spring 98 being arranged to transmit the thrust of the reciprocating yoke 96 to the die. The tension of the spring is adjustable, by means of a follower block 99 and screw-wheel 100—a well-known device for such purpose.

The die 93 is heated by means of electric heating elements 101, after the manner that the die 8 of the unit D is heated, and thus the machine is adapted to subject the assembled leaves to a second application of heat. This second application of heat resoftens the thermo-plastic coatings by means of which the paired leaf-forming laminae are united to each other and to the wire, and in consequence the two laminae of each leaf, being initially bonded on a central area by the dies of unit D, are by the anvil and die of unit F bonded on the marginal area that surrounds said central area. Whereas in the unit D the heat is applied to the lower lamina b' of each leaf, in the unit F the heat is applied to the upper lamina a'. Thus, in the course of the several leaf-forming operations, heat is twice applied to the assembled laminae of each leaf, and it is applied to opposite sides of the leaf. This secondary softening of the thermo-plastic coatings on the laminae is valuable, in that it renders the laminar bodies of the leaves more susceptible to the vein-impressing effect of the die 93. Additionally, it improves the integration of the laminae when, as the leaves pass from the unit F, the thermo-plastic material again solidifies.

Upon passing from the unit F and through the wire-advancing mechanism G, the leaves are successively presented to the shears K. The two cooperating cutters of the shears, to which the reference character K is immediately applied in Fig. I, are severally organized with two cams 102 on the drive-shaft I; that is, each cutter, mounted in the frame 13 for relative vertical movement, is organized with a vertically reciprocable connecting rod 103 that carries at its lower end a roller 105 that rides the rim of its associate cam. The cutters are operated in cadence with the successive advances of the leaf-bearing wire c, and they serve to cut the wire in the manner already described, to provide extending stems c' on each leaf.

In Figs. XVII and XVIII, we illustrate a modified form of the wire-cutting instrumentalities. In such modified structure a vertical frame 200 is pivoted at its upper end to a bracket 201 that is borne by the machine bed H. The frame 200 carries rigidly at its lower end a shear-blade 202, and at an interval thereabove it supports a vertically reciprocable shear-blade 203; the reciprocable shear-blade 203 is by a link 204 of non-magnetic material connected to the vertical armature 205 of an electro-magnet 206; the electro-magnet is normally de-energized, and a spring 207 normally holds the armature in elevated position, but upon energization of the electro-magnet the armature 205 is propelled downward, driving the upper blade 203 into shearing position with respect to the lower blade 202. The leaf-bearing wire c, delivered by the wire-advancing mechanism G (which is not shown in Fig. XVII, but will be understood to be arranged immediately to the left of the frame 200), passes over the cutting edge of the lower shear-blade 202, wherefore, it will be perceived, by energizing the magnet 206 at the proper intervals, the shears 202, 203 may be caused to cut the wire c at the leading point or tip of each leaf a', b' secured to the wire.

This electro-magnetically operated shearing mechanism includes a delicate electrical switch 208 arranged in the energizing circuit of magnet 206. This switch, carried on an arm 209 that at one end is pivoted on a pin 210 to the frame 200, normally is supported (by the said arm 209) in position above the course of advance of the wire-borne leaves a', b', and, when the switch is supported in such position, the operating finger 211 of the switch stands in circuit-interrupting position. That is to say, the switch is supported in elevated, circuit-interrupting position when the wire c is at rest between the successive advances imparted thereto by the mechanism G. When, however, the wire c is advanced, and each time that it is advanced, means function to swing the arm 209 downward, moving the switch into such position that its operating finger 211 stands vertically athwart the line of advance of the leaves a', b'. The leaf from whose leading tip the wire c is next to be cut (that is, the second from the leading leaf in the line of advance) strikes the switch finger 211, and carries it into circuit-closing position. The magnet 206 is energized, and the shear-blade 203 driven downward, to cut the wire c precisely at the tip of such leaf, thereby releasing the foremost leaf in the line, which falls into a chute, or into a suitable receptacle. The frame 200 is adapted to swing on the pivot pin on which it is at its upper end mounted, with the effect that the shear-blades, electro-magnet, and switch may move with the advancing wire, whereby the device operates as "flying" shears—shears that travel with the work, and function while traveling.

More particularly, in each pause between the successive advances of the wire c, the arm 209 is swung downward and the switch 208 lowered into operating position, and immediately thereafter the frame 200 is swung in clockwise direction (Fig. XVII), so that the shears and switch are moved to meet the next-to-the-leading leaf, and then, as the wire c advances, to move in unison with the advancing leaf (the frame 200 swinging counter-clockwise the while), while the shears are magnetically operated to sever the wire in the manner described. The means for effecting such movements of the frame 200 and the switch-bearing arm 209 consist in a lever 212 pivoted at 213 to a bracket 214 on the frame 200; a rod 215 connects the switch-supporting arm 209 with said lever 212, as shown; a rod 216 extends downward from the distal end of lever 212, and such rod 216 extends at its lower end slideably through an arm 217 that rides the surface of a cam 218 on the common drive shaft I of the machine, the drive shaft being shown, for clarity of illustration, normal to the plane of the paper, when as a matter of fact it extends parallel to such plane beneath the bed members H. A compression spring 219 is arranged between the body of the arm 217 and a nut 220 on the lower end of the rod 216; a nut 221 on the rod 216 bears on the top of cam-arm 217, and a tension spring 222 exerts an upward stress on the said arm 217, holding the arm to the cam 218, and, by abutment of the arm on the nut 221, urging the rod 216 upward, with the parts in the positions shown, and the frame 200 bearing against a stop 223 carried by bracket 201.

In service, the continuously rotated shaft I, in conjunction with the cam 218, functionally integrates and coordinates the electro-magnetically operated shearing mechanism with the other leaf-forming instrumentalities of the machine. Specifically, in the pauses between successive advances of the wire c, the cam 218 operates to swing the arm 217 downward; in consequence the rod 216 is by stress exerted through spring 219 pressed downward and the lever 212 is swung clockwise, effecting first the downward movement of the switch-supporting arm 209, and then the clockwise turning of the frame 200 through an angle sufficient to bring the finger 211 of the then lowered switch into contact with the leaf (a', b', Fig. XVII) at whose leading end the wire c is to be severed. More specifically, the downward movement of the rod 216 and the swing of the lever 212 initially effects only the switch-lowering movement of the arm 209, the frame 200 remaining at rest; however, when the switch reaches fully lowered position the arm 209 strikes a stop 224 (Fig. XVIII) on the frame 200, with the consequence that, further downward movement of the arm 209 thus prevented, the lever 212 becomes in effect rigidly integrated with the frame 200, and such frame swings with the lever under the pull of rod 216. Thus, the frame carries the switch and shears to meet the work. As the wire c immediately thereafter is advanced, the edge of the particular leaf a', b' moves against the switch finger 211, closing the switch, energizing the magnet 206, and operating the shears. The cam 218 is so designed and the tension of spring 219 is so determined that the frame may yield before the advancing leaf, resisting merely enough for the leaf to press the switch-arm 211 into circuit-closing position. Thus, an exceedingly effective shearing mechanism is provided—a mechanism that functions to cut the wire precisely at the tip of each leaf delivered thereto.

One other feature of the machine merits particular attention. It consists in means for automatically bringing the machine to a stop, in case the unit D fails to function properly. Referring to Fig. XVI such means include a platform 300 mounted on the machine framework, in such position that the leaves a', b' applied to the wire c slide flat upon the surface of the platform in the course of their advance with the wire from the unit D to the succeeding leaf-refining instrumentalities E and F of the machine. Above the platform 300, an arm 301 is mounted on fixed axis 302; extending to the left of such axis the arm carries a switch 303 that is included in the control circuit of the motor P ((Fig. I) that drives the shaft I; the switch has a sensitive switch-arm 304 that normally stands in circuit-interrupting position, and so long as it stands in such position, the energizing circuit of the motor P remains closed and the motor remains in operation.

Extending from the right of the axis 302, the arm 301 includes a portion 301a that, exceeding the weight of the switch and the portion of the arm on the left of the axis, bears lightly upon the leaves a', b' advanced by the wire c over the platform 300. The arm portion 301a extends parallel to the leaf-carrying wire c, but bears upon the leaves to one side of the wire, or on opposite sides of the wire if the arm portion is made bifurcate (as viewed in plan from above) as it may be. The length of the leaf-contacting arm portion 301a slightly exceeds the interval between successive leaves on the wire c, and so long as the unit D functions properly to apply the leaves to the wire, the arm 301 is by engagement with the leaves sustained in the position shown. When, however, the unit D fails to function properly in applying leaves to the wire, there will be a breach in the succession of leaves advanced over the platform 300, and this breach coming in the succession of leaves to the platform deprives the arm portion 301a of its support. The arm 300 thereupon swings in clockwise direction. In order that the swing may, for convenience, be through a greater interval than would be permitted by the thickness of the leaves alone, the platform 300 is slotted, as at 305, and the proportions of the slot are such that the arm portion 301a may, under conditions presently to be described, enter the slot and permit the arm 301 to swing through an interval sufficient to elevate the switch 303 into position to be engaged by a finger 306 borne on the vertically reciprocating carriage 7e of the upper die 7 of the unit D. (See Fig. IX.) The carriage 7e is shown in Fig. XVI at the lower limit of its range of vertical reciprocation, and, so long as the switch 303 remains in the illustrated normal position, the finger 306 does not contact the switch-arm 304, that is, the switch normally remains in circuit-interrupting position. When, however, the unit D fails to function properly and the resultant breach in the succession of leaves on the wire c comes to registry with the slot 305, the portion 301a of arm 301, freed of support, drops into the slot 305; the arm 301 swings clockwise, raising the switch 303 into such position that the vertically reciprocating finger 306 engages the switch-arm 304 and closes the control circuit in which the switch 303 is included. In known way the closing of the switch may, as indeed it is, be adapted to open the energizing circuit of the motor P and thus bring the shaft I to rest. The operation of the entire machine may be thus interrupted, whereupon such rectification or repair as is necessary may be made. It may be mentioned that the dimensions and organization of the parts are such that the shaft I, when the switch 303 has been operated in emergency, always comes to rest in the position in which the dies 7 and 8 of unit D are open, wherefore the shear-plates 4 and 5 are not subject to the heat of die 8 at rest.

Needless to say many modifications, variations, refinements and elaborations in the method and apparatus described are permissible, without departing from the invention defined below. In the claims the words "leaf" and "foliage" are words of definition and not limitation, and are intended to include not merely various forms of artificial leaves and foliage but artificial flowers, and the like, as well. Similarly, the word "wire" is used in a general sense, to include the various stem-forming materials that may be used, as mentioned in the introductory passages of the specification.

We claim as our invention:

1. The method of producing artificial foliage that comprises applying and solidifying a coat of thermo-plastic substance upon a long wire and applying and solidifying a film of such substance upon an elongate strip of leaf-forming material, advancing such wire in the direction of its extent and advancing said strip in synchronism therewith, cutting to the pattern of the desired leaf successive leaf-forming sections from the advancing strip and applying such sections to the wire at spaced-apart points in its extent, reducing with applied heat the coat and film respectively carried by said wire and said leaf-forming sections to plastic or adhesive condition, and under applied pressure bonding the leaf sections to the wire, with subsequent resolidification of the thermo-plastic substance of said coat and film.

2. The method of producing artificial foliage that comprises providing upon one surface of each of two strips of sheet material a film of thermo-plastic material in solidified and dry condition, cutting a leaf-forming lamina from each of such film-bearing strips and immediately bringing the two laminae together in peripheral registry on opposite sides of a leaf-stem-forming strand, with the film-bearing surfaces of the two laminae in contact, and, under the influence of heat and pressure, reducing the films carried by the laminae to plastic or adhesive condition and uniting the laminae to the interposed wire and to each other, with subsequent resolidification of the thermo-plastic substance of the laminae-uniting films.

3. The method of producing artificial foliage that comprises providing upon one surface of at least one of two strips of sheet material a film of adhesive material, advancing an elongate wire in the direction of its length, advancing said two strips of sheet material in courses spaced from and on opposite sides of the course of advance of said wire, with said film-carrying surface of one strip faced towards the other strip and with the wire extended between the strips, cutting from the so-advanced strips successive pairs of leaf-forming laminae and closing the laminae of the several pairs upon the intervening wire at longitudinally spaced points in the extent of the wire and in registered surface-to-surface contact with each other, and under applied pressure bonding the laminae of each pair to each other and to the wire, and parting the wire in the intervals between the bonded pairs of laminae.

4. The method of producing artificial foliage that comprises providing upon one surface of at least one of two strips of sheet material a film of adhesive material, advancing an elongate wire in the direction of its length, advancing said two strips of sheet material in courses spaced from and on opposite sides of the course of advance of said wire, with said film-carrying surface of one strip faced towards the other strip and with the wire extended between the strips, cutting from the advanced strips successive pairs of leaf-forming laminae and closing the laminae of the several pairs upon the intervening wire at longitudinally spaced points in the extent of the wire and in registered surface-to-surface contact with each other, and under applied pressure bonding the laminae of each pair to each other and to the wire, shearing the successively assembled and united pairs of laminae to refined peripheral contour, and parting the wire in the intervals between the bonded pairs of laminae.

5. The method of producing artificial foliage that comprises applying and solidifying upon sheet material a film of thermo-plastic substance, cutting to pattern from such film-bearing material a plurality of leaf-forming laminae and immediately bringing the laminae pair by pair in registered position, with the film-bearing face of one lamina against the film-bearing face of the other, upon an interposed stem-forming strand, reducing under momentarily applied heat thermo-plastic films carried by such laminae to plastic or adhesive condition, and under applied pressure bonding the registered laminae to said interposed strand and to each other; with subsequent resolidification of the thermo-plastic substances.

6. The method of producing artificial foliage that comprises applying to a strand of wire and to sheet material severally films of thermo-plastic substance that is dry at room temperature, cutting to pattern from such sheet material a plurality of leaf-forming laminae, assembling the laminae pair by pair in registered position, with the film-bearing face of one lamina against the film-bearing face of the other, upon opposite sides of said strand of wire, reducing the films of thermo-plastic substance to adhesive condition, and under applied pressure bonding the registered laminae to said strand and to each other.

7. The method of producing artificial foliage that comprises distributing upon at least one of a plurality of sheets of leaf-forming material a film of thermo-plastic substance that is dry at room temperature, cutting in predetermined pattern from each of such sheets a leaf-forming laminae, applying such laminae in registered face-to-face position upon opposite sides of a stem-forming strand, reducing said thermo-plastic substance to adhesive condition, and under applied pressure bonding the registered laminae to said strand and to each other.

8. The method of producing artificial foliage that comprises distributing upon at least one of a plurality of sheets of leaf-forming material a film of thermo-plastic substance that is dry at room temperature, and providing on a strand for forming the stems of such leaves a film of such thermo-plastic substance, cutting in predetermined pattern from such sheets leaf-forming laminae, applying a plurality of such laminae in registered face-to-face position on opposite sides of said stem-forming strand, reducing said thermo-plastic substance to adhesive condition, and under applied pressure bonding the registered laminae to said interposed strand and to each other.

9. The method herein described that comprises delivering two strips of sheet material, faced with an adhesive, into position on opposite sides of a reach of wire, with the bodies of the two strips spaced from the wire and with the adhesive carrying faces of the strips directed towards one another, punching a patterned section from each strip and under the impulse of the punching instrumentalities carrying the two patterned sections into contact with the interposed wire and with each other, and, under the influence of said instrumentalities, bonding said patterned sections to the wire and to each other.

10. The method herein described that comprises applying to an elongate strand a coating of thermo-plastic substance in liquid condition, advancing the strand step by step in a course that extends adjacent to a shearing die, and in an interval between successive advances of said strand shearing a patterned leaf from sheet material fed to said die, and, while the coating on the strand is in heated and plastic condition, assembling such leaf upon the strand under pressure of the shearing instrumentality, with subsequent solidification of the thermo-plastic substance, and upon an ensuing advance of the strand severing the strand at a point spaced from the applied leaf.

11. The method herein described that comprises applying to a sheet of leaf-forming material a film of thermo-plastic substance in liquid condition, advancing a leaf-stem-forming strand step by step in a course that extends adjacent to a shearing die, and in an interval between successive advances of said strand shearing a patterned leaf from said sheet, and, while the film on the sheet is in heated and plastic condition, assembling the leaf upon the strand under pressure of the shearing instrumentalities, with subsequent solidification of the thermo-plastic substance, and upon an ensuing advance of the strand severing the strand at a point spaced from the applied leaf.

12. The method herein described that comprises arranging two strips of sheet material, at least one of which is faced with adhesive material in dry condition, into position on opposite sides of a reach of wire, with said adhesive-carrying face directed towards the wire, punching a patterned section from each strip and immediately closing the two patterened sections upon the interposed wire and upon each other, and while the sections are under the influence of the punching instrumentalities, reducing said adhesive to plastic condition and bonding the said sections to the wire and to each other.

13. Apparatus for the manufacture of an artificial leaf, comprising a member having a shearing orifice conforming in outline to the pattern of the leaf to be formed, means adapted to feed the end of a strip of sheet material into position over said orifice, means for sustaining a leaf-stem-forming wire in position beneath said orifice, a shearing die arranged above said orificed member, and means for closing said die upon the orificed member to shear from said sheet material a patterned leaf-forming element, said last means adapted to continue such die-closing movement, carrying the die into said orifice, with the effect that said patterned element is brought to leaf-forming assembly with said wire.

14. Apparatus for the manufacture of an artificial leaf comprising a member having a shearing orifice conforming in outline to the pattern of the leaf to be formed, means adapted to feed to position over said orifice the end of a strip of sheet material carrying adhesive on its nether surface, means for sustaining a leaf-stem-forming wire in position beneath said orifice, a shearing die arranged above said orificed member, and means for closing said die upon the orificed member to shear from said sheet material a patterned leaf-forming element, said last means adapted to continue such die-closing movement, carrying the die into said orifice and carrying said patterned element through said orifice and uniting it to said wire.

15. The structure of claim 13, in which said die includes inset in its body a plug, together with means for advancing the plug when the die is in fully advanced position in said orifice, for concentrating the pressure of the patterned element against said wire.

16. The structure of claim 13, together with means for maintaining said wire under substantially uniform tension, and means for shifting the tensioned wire when said patterned element has been united thereto.

17. The structure of claim 13, together with means cooperating with said die and orificed member for detaching from such sheet material the scrap material left by the removal of said patterned element therefrom.

18. The structure of claim 13, together with means cooperating with said die and orificed member for detaching from such sheet material the scrap material left by the removal of said patterned element therefrom, and pneumatic means for blowing the detached scrap material from between the die and orificed member.

19. The structure of claim 13, together with means cooperating with said die and orificed member for detaching from such sheet material the scrap material left by the removal of said patterned element therefrom, and pneumatic means for blowing the detached scrap material from between the die and orificed member, and suction means for receiving said scrap material and leading it to a point of disposal.

20. The structure of claim 13, together with stripper means for preventing the sheet material from which said patterned element is sheared from sticking to said die.

21. The structure of claim 13, said strip-feeding means including a guiding device provided with a way of curved cross section through which the strip is advanced, whereby the strip tends to remain aligned in the rectilinear course of its advance, as described.

22. The structure of claim 13, together with means for impressing veins in the patterned elements applied to said wire, and means operating in coordination with said shearing die for advancing said wire, to carry said elements applied to the wire from beneath said orificed member to said vein-impressing means.

23. Apparatus for the manufacture of an artificial leaf comprising a member having a shearing orifice conforming in outline to the pattern of the leaf to be formed, means adapted to feed to position over said orifice the end of a strip of sheet material carrying thermo-plastic substance on its nether surface, means for sustaining a leaf-stem-forming wire in position beneath said orifice, a heated member beneath said wire, a shearing die arranged above said orificed member, and means for closing said die upon the orificed member to shear from said sheet material a patterned leaf-forming element, said last means adapted to continue such die-closing movement, carrying the die into said orifice, carrying said patterned element through said orifice to position upon said wire, and pressing the wire and patterned element against said heated member, with the effect that said thermo-plastic substance is reduced to adhesive condition and said patterned element is bonded to said wire.

24. Apparatus for the manufacture of an artificial leaf comprising a member having a shearing orifice conforming in outline to the pattern of the leaf to be formed, means adapted to feed to position over said orifice the end of a strip of sheet material, means for sustaining a leaf-stem-forming wire, coated with thermo-plastic substance, in position beneath said orifice, a heated member beneath said wire, a shearing die arranged above said orificed member, and means for closing said die upon the orificed member to shear from said sheet material a patterned leaf-forming element, said last means adapted to continue the movement of said die into said orifice, carrying said patterned element through said orifice and into position upon said wire and pressing the wire and patterned element against said heated member, with the effect that said thermo-plastic substance is reduced to adhesive condition and said patterned element is bonded to said wire, said shearing orifice providing means for guiding the leaf-forming element into centered position upon said wire.

25. Apparatus for the manufacture of artificial leaves comprising a member having a shearing orifice conforming in outline to the pattern of the leaves to be formed, means for intermittently advancing the end of a strip of sheet material into position over said orifice, means for sustaining a leaf-stem-forming wire in taut position beneath said orifice, said means including mechanism for advancing said wire step by step in the direction of its extent, a shearing die arranged above said orificed member, and means for reciprocating said die, to close die upon the orificed member in the intervals between the successive advances of the wire and causing the die to shear from said sheet material successive patterned leaf-forming elements, said last means adapted to continue each shearing movement of the die into said orifice, with the effect that the several leaf-forming elements are assembled in spaced-apart relation upon said intermittently advanced wire.

26. In a machine for the manufacture of artificial foliage, die means for shearing leaf-forming laminae from sheet material, means for delivering a strip of such material to said die means, said means including a guide of curved cross section for the strip, whereby the strip advanced therethrough is provided with a self-aligning and sustaining rigidity, means for feeding the strip step by step through said guide, said last means including a pair of feeding rollers between which the strip is engaged, means for intermittently rotating said rolls, and means for separating the rolls between each strip-advancing rotation of the rolls, momentarily to release the strip, for the purpose described.

27. Means for feeding a strip of sheat material to the dies of a machine for producing artificial foliage, said means including a guide forming an elongate way through which the strip is advanced, said way being of curved cross section, whereby the strip, correspondingly curved, is provided with a rigidity adequate to make the strip self sustaining when projected an interval from the guide.

28. In apparatus for the manufacture of artificial foliage, means for applying at spaced-apart points to a wire patterned leaf-forming elements coated with thermo-plastic substance, means for impressing veins in said elements, said means including a pair of veining dies, means for advancing said wire intermittently, to carry said elements on the wire successively into position of registry with said dies, means for closing the dies upon the leaf-forming elements thus brought into position between them, one of said dies including means for heating it, to augment the vein-forming effect of the dies upon the so-coated leaf-forming elements.

29. In apparatus for the manufacture of artificial foliage, means for applying patterned leaf-forming elements in registered pairs upon an interposed stem-forming wire, with the paired elements arranged at spaced apart points in the extent of the wire, said leaf-forming elements being united with thermo-plastic substance, means for impressing veins in said paired elements on the wire, said means including a pair of veining dies, means for advancing said wire intermittently, to carry said paired elements on the wire successively into position of registry with the dies, means for closing the dies upon the leaf-forming elements thus brought into position between them, at least one of said dies including die-heating means, whereby, as the dies close to impress veins in said paired leaf-forming elements, said thermo-plastic substance is momentarily reduced to plastic condition, to augment the vein-forming operation.

30. The structure of claim 29, in which the leaf-forming elements of each of said pairs of elements advancing to the veining dies are centrally united to each other and to the wire by said thermo-plastic substance, said veining dies including portions effective marginally to unite the paired elements in the course of the vein-impressing operation of the dies.

31. A machine for the manufacture of artificial foliage including means for sustaining a wire under tension, means for advancing the tensioned wire step by step, means operating between the successive advances of the wire to shear leaf-forming elements from sheet material and apply such elements to said wire, means for feeding sheet material to said shearing means in cadence with operation of said wire-advancing means, means for impressing veins in said leaves, said means adapted in the successive advances of said wire to receive successively the leaf-forming elements applied thereto, said veining means operating in the intervals of rest of the wire to impress veins in the leaf-forming elements received thereby.

32. The structure of claim 31, together with shearing instrumentalities arranged between the shearing dies first mentioned and the veining means for refining the peripheral contour of the leaf-forming elements applied to said wire.

33. The structure of claim 31, together with means operating in synchronism with the means defined therein to sever the wire between the successive leaf-forming elements applied thereto.

34. A machine for the manufacture of an artificial leaf and the like including a machine frame, a pair of plates each including an orifice in the pattern of such leaf, said plates being mounted in said frame in parallel relation and with the orifices therein in alignment, said plates being adapted to receive between their inner or facing surfaces a leaf-stem-forming wire, and adapted to receive on their outer surfaces each a web of sheet material, a shearing die organized with each plate, means for reciprocating said dies simultaneously relatively to said plates to cut, in cooperation with the orifices therein, two leaf-forming laminae from said webs, said die-reciprocating means being effective to carry said dies inward of their associate orifices, bringing the two laminae together on opposite sides of said wire and into bonding surface-to-surface contact.

35. The structure of claim 34, in which at least one of said dies includes means for heating the die centrally.

36. The structure of claim 34, in which one of said dies includes a central plug, and means for shifting said plug relatively to the die when the two dies have brought said patterned laminae together on the intervening wire, with the effect that the bonding pressure on said laminae is concentrated over a portion of the common area of said laminae.

37. The structure of claim 34, in which at least one of said dies includes means for heating the die centrally, one of said dies includes a central plug, and means for shifting said plug relatively to the die when the two dies have brought said patterned laminae together on the intervening wire, with the effect that the bonding pressure on said laminae is concentrated over a portion of the common area of said laminae.

38. The structure of claim 34, in which one of said dies includes a central plug, and means for shifting said plug relatively to the die when the two dies have brought said patterned laminae together on the intervening wire, with the effect that the bonding pressure on said laminae is concentrated over a portion of the common area of said laminae, said leaf-manufacturing machine including means for impressing veins in the paired laminae assembled upon said wire, said veining means adapted to apply concentrated bonding pressure to the area of the leaf surrounding the area engaged by said plug.

39. In a machine for manufacturing artificial foliage from sheet material coated with thermoplastic substance, including a die and a shear-plate, said die including means for centrally heating its work-contacting face, and means for cooling the edge of the die extending peripherally of the heated area of its said work-contacting face.

40. In an apparatus for manufacturing artificial leaves including means for advancing a leaf-stem-forming wire, electrically controlled instrumentalities for applying patterned leaf-forming elements to said wire at spaced-apart points in the extent of the wire, and a control circuit for said instrumentalities including a switch; the improvement herein described in which said switch is mounted upon an elongate arm adapted to swing between a position in which said switch is adapted to close said control circuit and a position in which said switch is adapted to interrupt such circuit, said arm including a portion adapted, with the switch in circuit-closing position, to bear lightly upon the leaf-forming elements applied to said wire and advanced therewith through said apparatus, the leaf-element-contacting portion of said arm exceeding in length the interval between the successive leaf-forming elements on said wire, whereby when said instrumentalities fail properly to apply a leaf-forming element to said wire, said arm swings into the position in which said switch is adapted to interrupt such circuit.

41. In apparatus for applying a plurality of artificial leaves in spaced relation upon a wire advanced through the apparatus, said apparatus including electric control means; the improvement herein described in which said means include an arm adapted to swing between alternate positions, said arm having a portion bearing upon the leaves carried by the advanced wire, and, by such contact with successive leaves on the wire, sustaining the arm in one of said alternate positions, said portion of the arm exceeding in effective length the interval between successive leaves on the wire, whereby, if one of or more leaves are omitted from or are improperly placed upon said wire, said arm is released to swing into alternate position.

42. Apparatus for applying a plurality of artificial leaves in spaced relation upon a wire advanced through the apparatus, said apparatus including electric control means having an electrical switch, and a switch-shifting member engaged successively by the leaves applied to the advancing wire and while so engaged maintaining the switch in a particular position, said switch-shifting member adapted, when such engagement is interrupted by improper application or lack of application of leaves to said wire, to move the switch into said alternate position.

43. The method herein described of producing artificial foliage that comprises projecting the ends of two strips of sheet material to position on opposite sides of a stem-forming strand, shearing from such projecting ends of the strips severally two foliage-forming portions, and then uniting such portions with the interposed strand and with each other.

44. In a machine for manufacturing artificial foliage that includes means for applying patterned leaf-forming elements at spaced-apart points upon a reach of wire, means for advancing the wire step-by-step through the machine, and means for maintaining the wire under substantially constant tension; the invention herein described in which said wire-tensioning means comprise a member bearing with substantially constant stress upon a bight in said wire, said wire-advancing means being effective to draw wire under such stress from said bight, and means for automatically enlarging the bight, to replenish the wire drawn therefrom by said wire-advancing means, said last means including an electric motor, and switch means for periodically opening and closing the energizing circuit of such motor, said switch means provided with an operating member movable according as said bight is automatically diminished and enlarged.

45. In a machine of the class described that includes means for applying leaf elements at spaced-apart points on a wire that extends in continuous length from a supply coil, tensioning means effective upon a bight in the length of wire extending from said supply coil, means for securing the wire against withdrawal from said supply coil, feeding means for advancing to the first-named means wire drawn from the bight against the effect of said tensioning means, with diminution in the size of the bight, and means for releasing said wire-securing means from time to time, to admit of the advance of wire from said supply coil for increasing the size of the bight.

ROBERT R. TUCKER.
BERNARD A. WEYL.